US011612899B2

(12) United States Patent
Siler et al.

(10) Patent No.: US 11,612,899 B2
(45) Date of Patent: Mar. 28, 2023

(54) VIBRATION ISOLATION FOR CENTRIFUGE TESTBEDS

(71) Applicant: National Technology & Engineering Solutions of Sandia, LLC, Albuquerque, NM (US)

(72) Inventors: David Michael Siler, Albuquerque, NM (US); Michael Edward Ferdinand, Placitas, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 267 days.

(21) Appl. No.: 17/202,158

(22) Filed: Mar. 15, 2021

(65) Prior Publication Data
US 2022/0288606 A1 Sep. 15, 2022

(51) Int. Cl.
*F16F 15/08* (2006.01)
*G01M 7/02* (2006.01)
(Continued)

(52) U.S. Cl.
CPC ............... *B04B 5/10* (2013.01); *F16F 15/08* (2013.01); *G01M 7/022* (2013.01); *G01M 7/027* (2013.01);
(Continued)

(58) Field of Classification Search
CPC .......... B04B 5/10; B06B 1/0629; F16F 15/08; F16F 2234/02; F16F 2234/06;
(Continued)

(56) References Cited

U.S. PATENT DOCUMENTS 7,851,973 B1 * 12/2010 Jepsen ................ H01L 41/0906
310/311
8,408,066 B1 * 4/2013 Romero ................ G01M 7/022
73/761
(Continued)

FOREIGN PATENT DOCUMENTS

CN 102652930 A * 9/2012
CN 202570441 U * 12/2012
(Continued)

OTHER PUBLICATIONS

Jepsen, The Significance and Future of Combined Environments for Flight Testing, Sandia National Labs (Year: 2018).*
(Continued)

*Primary Examiner* — David L Singer
(74) *Attorney, Agent, or Firm* — Gregory M. Doudnikoff; Yee & Associates, P.C.

(57) ABSTRACT

A method for isolating vibrations for centrifuge testing devices is provided. The method comprises coupling a test payload platform to a number of piezoelectric actuators and coupling the piezoelectric actuators to a reaction mass coupled to a centrifuge arm. A layer of vibration-absorbing material is sandwiched between the reaction mass and the centrifuge arm. The centrifuge arm is rotated around an axis, and the test payload platform is vibrated with the piezoelectric actuators as the centrifuge rotates, wherein the layer of vibration-absorbing material prevents vibrations from traveling down the centrifuge arm.

20 Claims, 8 Drawing Sheets

(51) Int. Cl.
  *G01M 99/00* (2011.01)
  *B04B 5/10* (2006.01)
  *B06B 1/06* (2006.01)

(52) U.S. Cl.
  CPC ......... *G01M 99/004* (2013.01); *B06B 1/0629* (2013.01); *F16F 2234/02* (2013.01); *F16F 2234/06* (2013.01)

(58) Field of Classification Search
  CPC .... G01M 5/0075; G01M 7/022; G01M 7/027; G01M 99/004
  See application file for complete search history.

(56) References Cited

U.S. PATENT DOCUMENTS

| | | | | |
|---|---|---|---|---|
| 10,421,081 | B2* | 9/2019 | Rector | B04B 5/0421 |
| 2004/0018927 | A1* | 1/2004 | Baik | B04B 5/0421 494/10 |
| 2005/0054507 | A1* | 3/2005 | Cornay | B04B 1/00 494/33 |
| 2014/0057770 | A1* | 2/2014 | Holmes | B04B 9/10 494/10 |
| 2017/0216851 | A1* | 8/2017 | Matsushima | B04B 9/12 |

FOREIGN PATENT DOCUMENTS

| | | | | | |
|---|---|---|---|---|---|
| CN | 105547628 | A | * | 5/2016 | |
| CN | 205426463 | U | * | 8/2016 | |
| CN | 105928681 | A | * | 9/2016 | |
| CN | 105973269 | A | * | 9/2016 | ........... G01C 25/005 |
| CN | 108318201 | A | * | 7/2018 | |
| CN | 109115439 | A | * | 1/2019 | ............. G01M 7/02 |
| CN | 111780938 | A | * | 10/2020 | ........... G01M 7/022 |
| CN | 218013393 | U | * | 12/2022 | |
| DE | 4209625 | A1 | * | 9/1993 | ............... B04B 9/12 |

OTHER PUBLICATIONS

Romero et al, Sandia National Laboratories Vibrafuge & Superfuge Development & Needs, Cedrat Technologies, France, Nov. 14-15, 2017 (Year: 2017).*
Rogers et al, Vibrafuge—Combine Vibration and Centrifuge Testing, Sandia National Lab (Year: 1989).*
Vangoethem et al, Vibrafuge: Re-entry and Launch Test Simulation in a Combined Linear Acceleration and Vibration Environment, 44th AIAA Aerospace Sciences Meeting and Exhibit Jan. 9-12, 2006, Reno, Nevada (Year: 2006).*
Guan et al, Testing Vibration Rectification Error with Vibrafuge, MAPAN—Journal of Metrology Society of India (Dec. 2014) 29(4):289-294 (Year: 2014).*
Luo et al, Overview of the Key Technical Issues in Chinese Largest Uniaxial Centrifuge Shaker, Proceedings of 2014 IEEE International Conference on Mechatronics and Automation Aug. 3-6, Tianjin, China (Year: 2014).*
Zhong-bao et al, Design of a Novel Support Device and Its Application in Two-axis Centrifuge Shaker, 2013 International Conference on Mechatronic Sciences, Electric Engineering and Computer (MEC) Dec. 20-22, 2013, Shenyang, China (Year: 2013).*
Yang et al, A Survey of Combined Acceleration and Vibration Environment Simulator, Equipment Environmental Engineering, vol. 13 Issue 6 (Year: 2016).*

* cited by examiner

US 11,612,899 B2

VIBRATION ISOLATION FOR CENTRIFUGE TESTBEDS

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to centrifuges, and more specifically to improved vibrafuge testbeds.

2. Description of the Related Art

Centrifuges are often used for ground-based testing of flight systems by generating high G (gravitational) forces to simulate flight inertial loads. Realistic combined environment testing is optimal for quantifying flight component and system performance. To simulate flight environments more closely, controlled vibration can be added to test units under inertial loading. A centrifuge incorporating controlled vibration is known as a vibrafuge. The combination of inertial and vibrational loads provides synergistic effects regarding the ability to determine margin assessment of system performance.

SUMMARY

An illustrative embodiment provides a method for isolating vibrations for centrifuge testing devices. The method comprises coupling a test payload platform to a number of piezoelectric actuators and coupling the piezoelectric actuators to a reaction mass coupled to a centrifuge arm. A layer of vibration-absorbing material is sandwiched between the reaction mass and the centrifuge arm. The centrifuge arm is rotated around an axis, and the test payload platform is vibrated with the piezoelectric actuators as the centrifuge rotates, wherein the layer of vibration-absorbing material prevents vibrations from traveling down the centrifuge arm.

Another illustrative embodiment provides a centrifuge testing device. The device comprises a centrifuge arm coupled to a rotational axis, a reaction mass coupled to the centrifuge arm, a layer of vibration-absorbing material sandwiched between the reaction mass and the centrifuge arm, a number of piezoelectric actuators coupled to the reaction mass, and a test payload platform coupled to the piezoelectric actuators, wherein the piezoelectric actuators are configured to apply vibrations to the test payload platform as the centrifuge arm rotates around the rotational axis, and wherein the layer of vibration-absorbing material prevents vibrations from traveling down the centrifuge arm.

Another illustrative embodiment provides a centrifuge testing device. The device comprises a centrifuge arm coupled to a rotational axis. A reaction mass is coupled to a distal end of the centrifuge arm, wherein the reaction mass comprises a first plate and second plate orthogonal to each other and reinforced by lateral gussets, and wherein the first plate is connected to the centrifuge arm. A layer of vibration-absorbing material is sandwiched between the first plate of the reaction mass and the centrifuge arm, and a number of piezoelectric actuators are coupled to the second plate of the reaction mass pointing distally from the rotational axis. A test payload platform is coupled to the piezoelectric actuators, wherein the piezoelectric actuators are configured to apply vibrations to the test payload platform as the centrifuge arm rotates around the rotational axis, and wherein the layer of vibration-absorbing material prevents vibrations from traveling down the centrifuge arm.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that adding controlled vibration to centrifugal inertial load simulates flight environments more closely.

The illustrative embodiments also recognize and take into account that the vibrations generated in a vibrafuge system can travel down the centrifuge arm and possibly damage the rotary bearings.

The illustrative embodiments provide a method for isolating vibrations in a vibrafuge system. The illustrative embodiments comprise combined radial and axial isolation components to reduce residual vibration from the controlled input to the centrifuge equipment.

Figure 1:
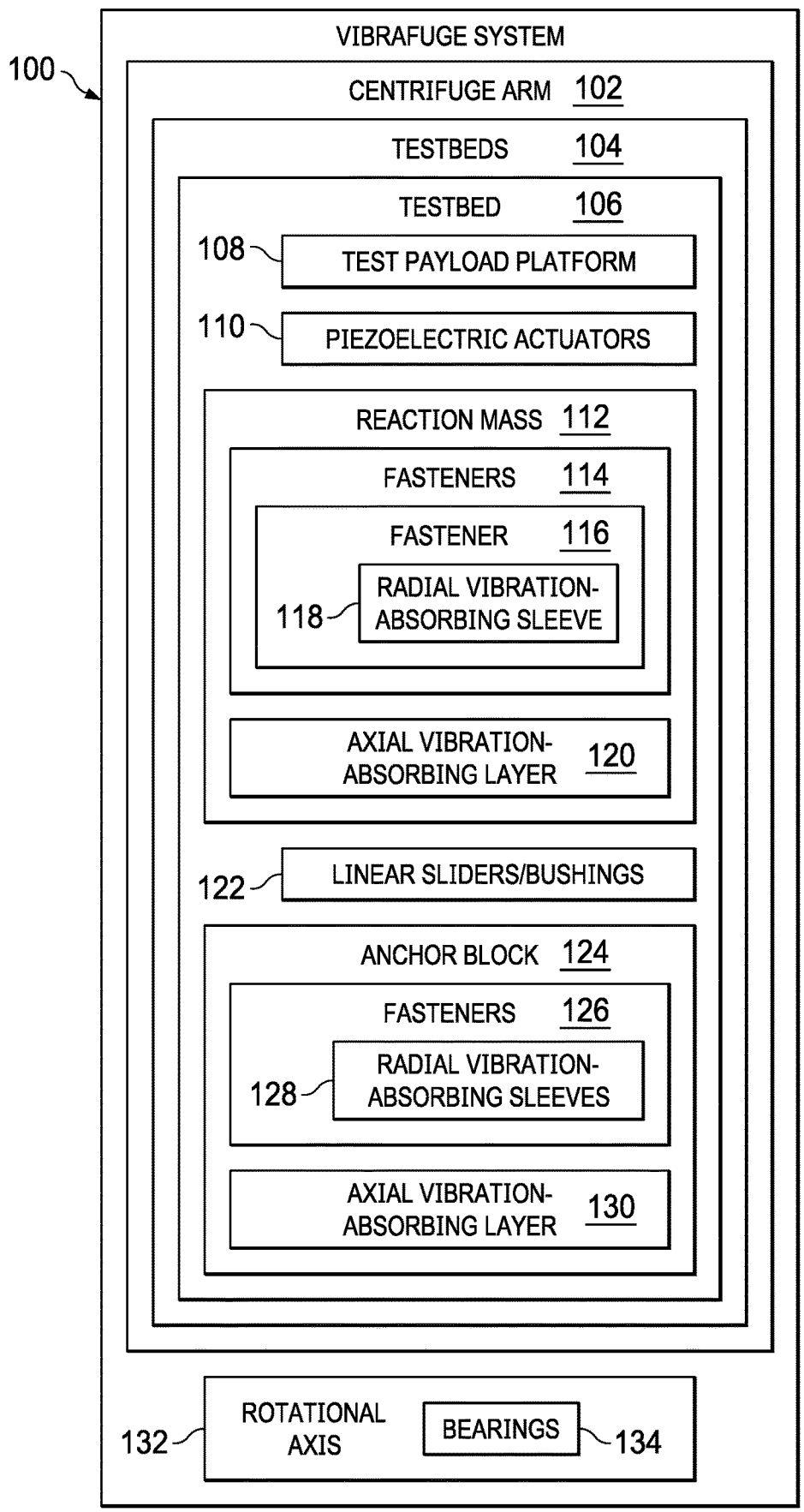
FIG. 1 depicts a block diagram illustrating a vibrafuge system in accordance with an illustrative embodiment.

FIG. 1 depicts a block diagram illustrating a vibrafuge system in accordance with an illustrative embodiment. Vibrafuge system 100 comprises a centrifuge arm 102 that rotates around rotational axis 132 on bearings 134.

Coupled to centrifuge arm 102 are a number of testbeds 104. Each testbed 106 comprises a payload platform 108 to which test items such as, e.g., aircraft components, can be mounted. Test payload platform 108 is coupled to a number of piezoelectric actuators 110 that provide controlled vibrations to the test payload platform.

The piezoelectric actuators 110 are coupled to reaction mass 112. Reaction mass 112 comprises a number of fasteners 114 that couple the reaction mass to centrifuge arm 102. Each individual fastener 116 is surrounded by a sleeve of vibration-absorbing material 118. This sleeve 118 absorbs vibrations moving radially relative to the rotational axis 132 around which centrifuge arm 102 rotates. A layer of vibration-absorbing material 120 is sandwiched between reaction mass 112 and centrifuge arm 102. Vibration-absorbing material 120 absorbs vibrations in the axial (vertical) direction and prevents vibrations from traveling down the centrifuge arm 102.

Testbed 106 might also comprise an anchor block 124 that is also coupled to centrifuge arm 102 and connected to reaction mass 112 by linear sliders 122. Test payload platform 108 can vibrate back and forth between reaction mass 112 and anchor block 124 on linear sliders 122 in response to input from piezoelectric actuators 110.

Anchor block 124 is coupled to centrifuge arm 102 by fasteners 126, which each have respective vibration-absorbing sleeves 128. Another layer of vibration-absorbing material 130 might be sandwiched between anchor block 124 and centrifuge arm 102 to absorb axial vibrations and prevent them from traveling down centrifuge arm 102.

Vibration-absorbing sleeves 118, 128 and layers 120, 130 might comprise rubber or similar vibration-absorbing materials.

Figure 2:
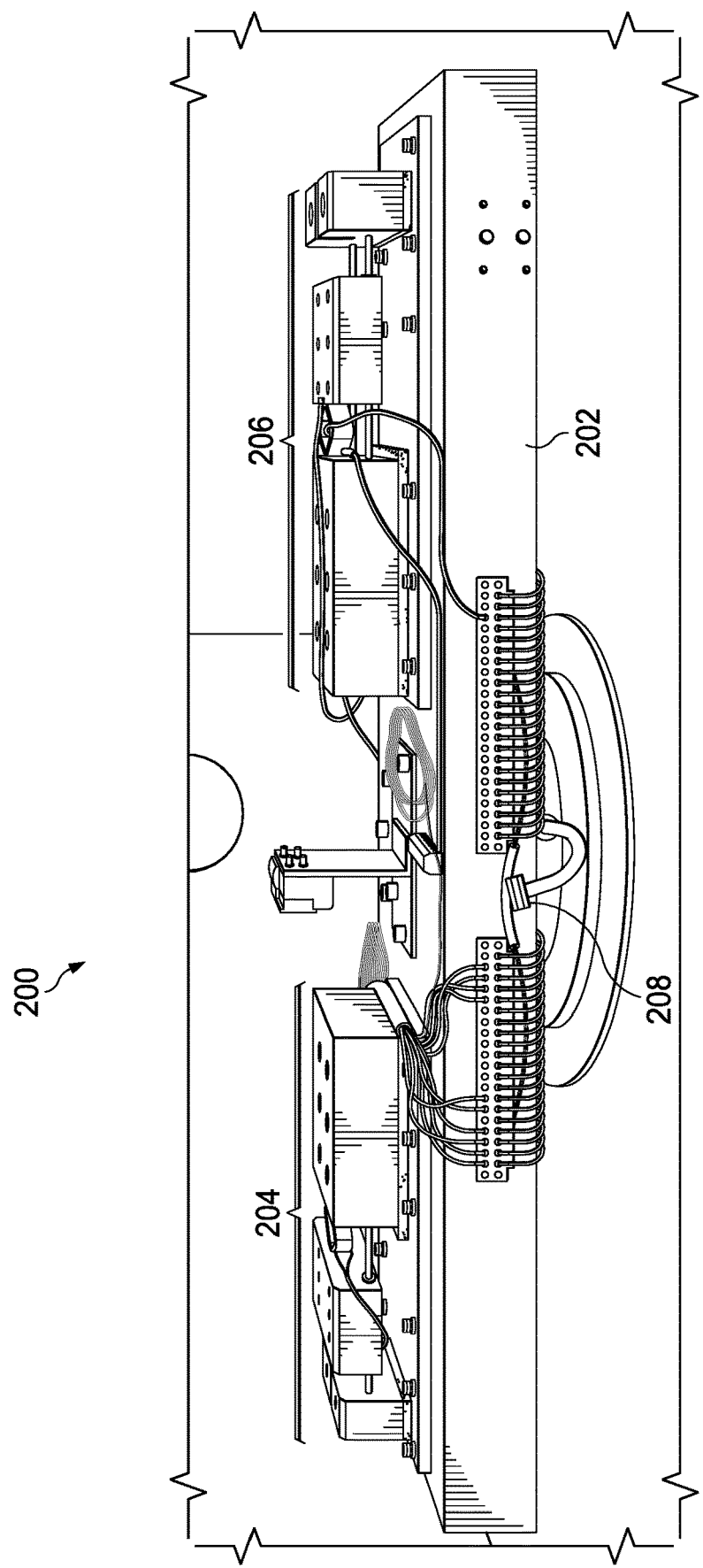
FIG. 2 illustrates a side view of a vibrafuge system in accordance with an illustrative embodiment.

FIG. 2 illustrates a side view of a vibrafuge system in accordance with an illustrative embodiment. Vibrafuge system 200 might be an example of vibrafuge system 100 shown in FIG. 1. Vibrafuge system 200 comprises a centrifuge arm 202 that rotates around a rotational axis on bearings 208. In the present example, vibrafuge system 200 comprises two testbeds 204 and 206 coupled to centrifuge arm 202.

Figure 3:
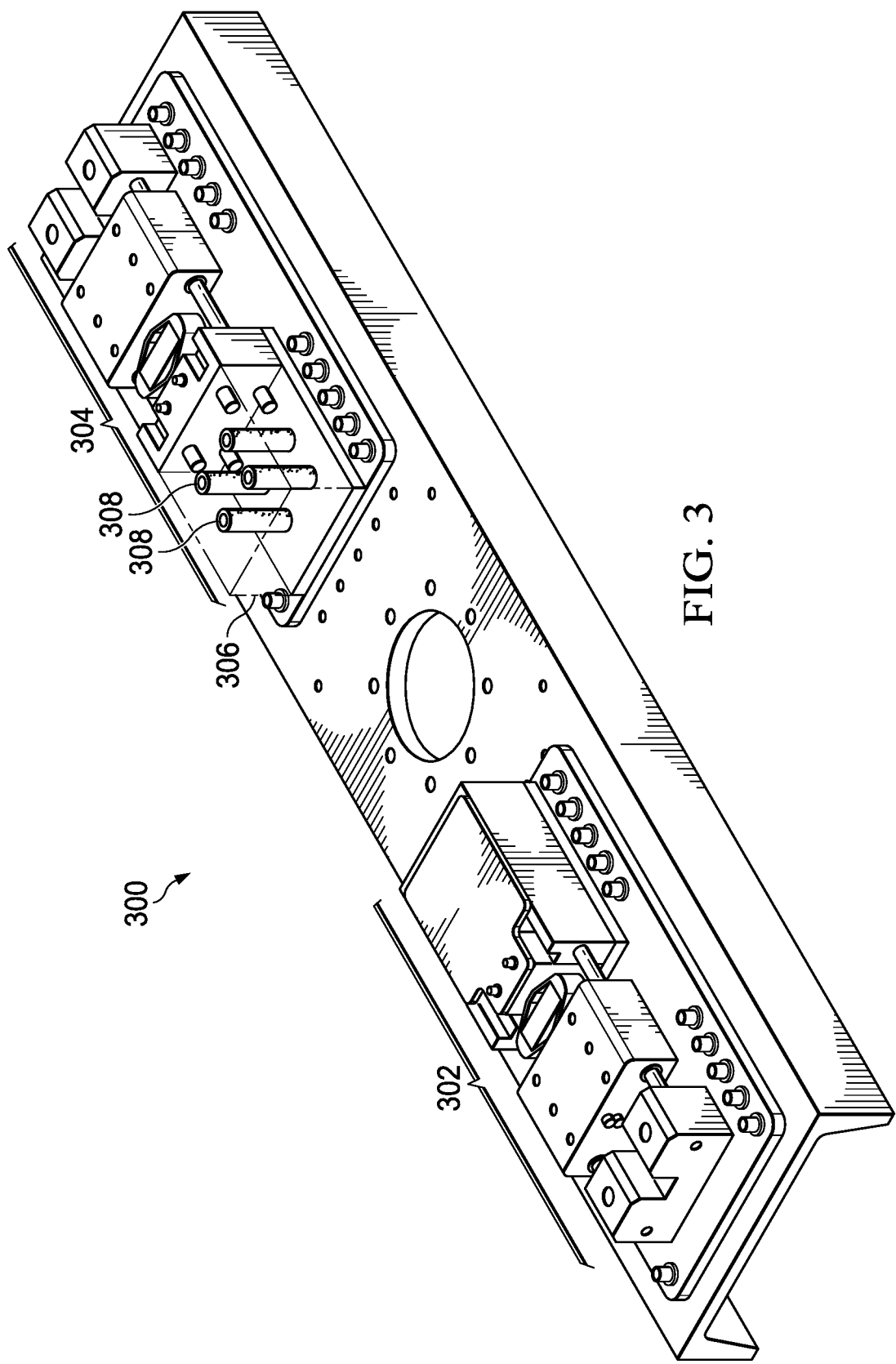
FIG. 3 illustrates a perspective view of a vibrafuge arm in accordance with an illustrative embodiment.

FIG. 3 illustrates a perspective view of a vibrafuge arm in accordance with an illustrative embodiment. Vibrafuge arm 300 might be an example of centrifuge arm 102 in FIG. 1 and centrifuge arm 202 in FIG. 2 and comprises testbeds 302, 304.

In the present example, reaction mass 306 is depicted in cross-section to illustrate cylindrical fasteners 308 enveloped in vibration-absorbing sleeves.

Figure 4:
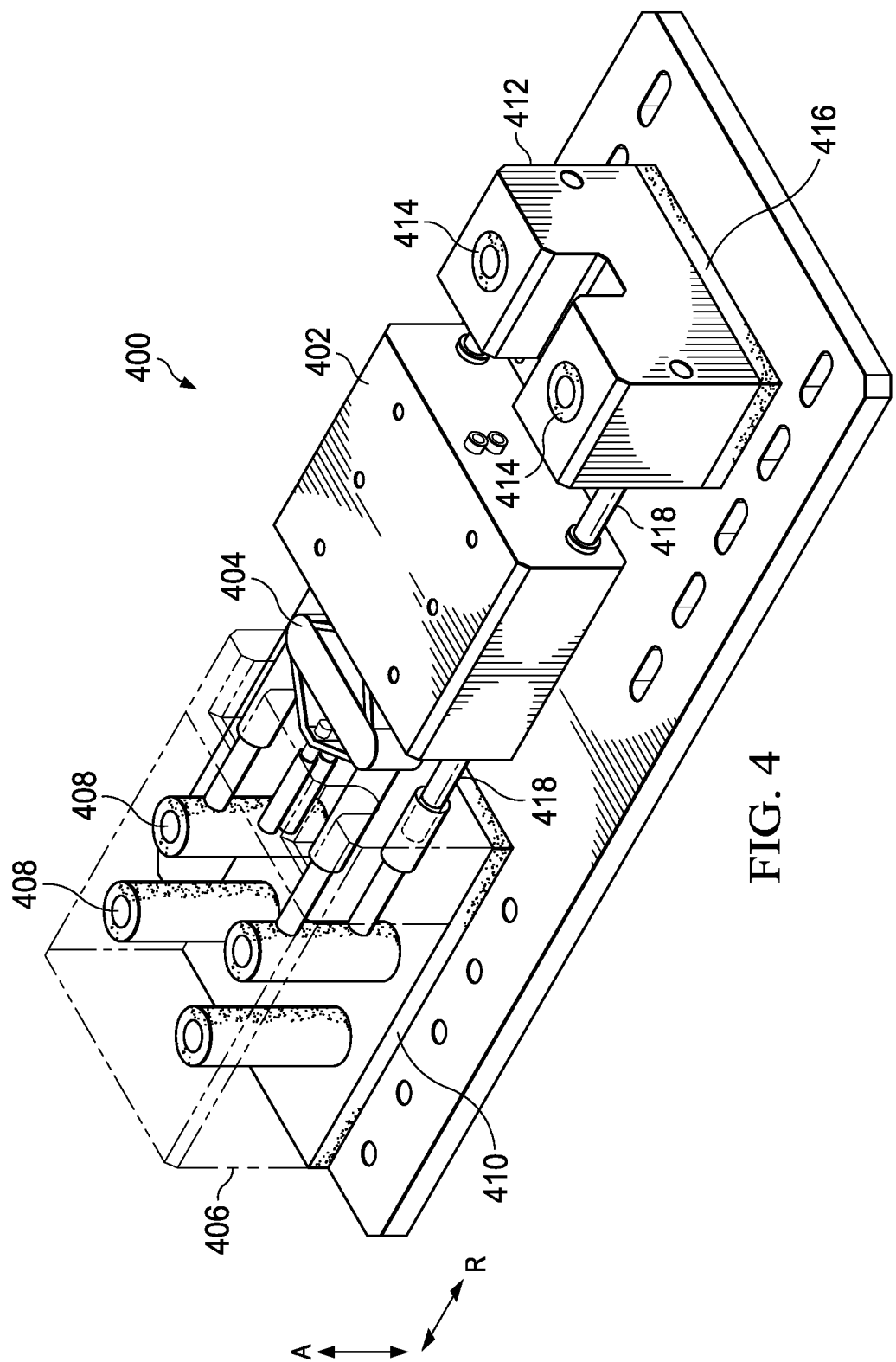
FIG. 4 illustrates a perspective view of a vibrafuge testbed in accordance with an illustrative embodiment.

FIG. 4 illustrates a perspective view of a vibrafuge testbed in accordance with an illustrative embodiment. Testbed 400 might be an example of testbed 106 in FIG. 1. Test payload platform 402 is positioned between reaction mass 406 and anchor block 412.

In the present example, a single piezoelectric actuator 404 is coupled to the test payload platform 402 on one side and reaction mass 406 on the other. As the piezoelectric actuator imparts kinetic energy to test payload platform 402, the test payload platform moves back and forth along linear sliders 418 between reaction mass 406 and anchor block 412.

Vibration-absorbing layers 410 and 416 below reaction mass 406 and anchor block 412, respectively, prevent axial vibrations (indicated by arrow A) and radial vibrations (indicated by arrow R) generated by piezoelectric actuator 404 from traveling down the centrifuge arm (such as centrifuge arm 202 shown in FIG. 2).

Similarly, cylindrical fasteners 408, 414, which couple reaction mass 406 and anchor block 412, respectively, to the centrifuge arm are surrounded by respective sleeves (shown more clearly in FIG. 5), which absorb radial vibrations.

Figure 5:
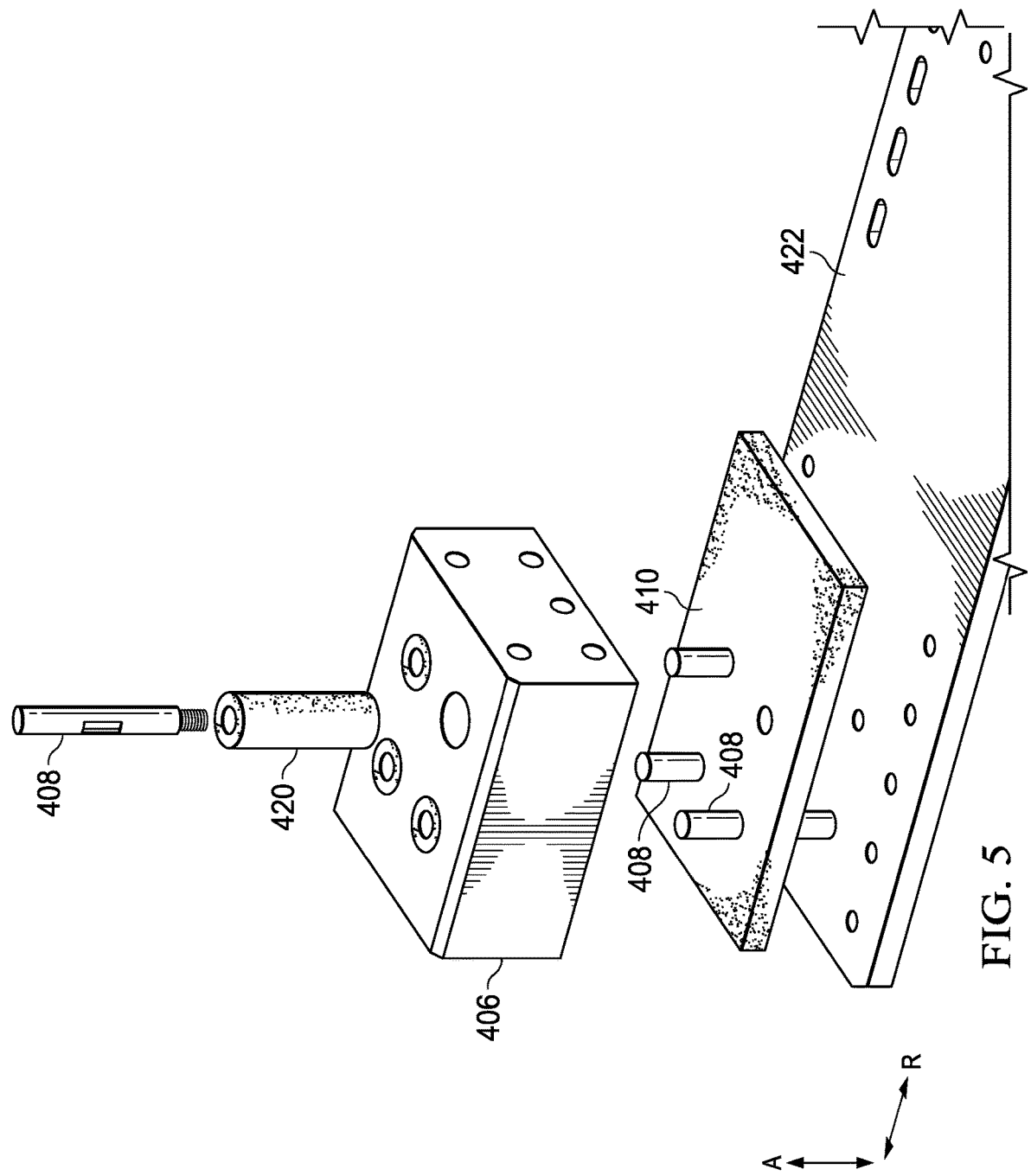
FIG. 5 illustrates an exploded perspective view of a vibrafuge testbed in accordance with an illustrative embodiment.

FIG. 5 illustrates an exploded perspective view of vibrafuge testbed 400 in accordance with an illustrative embodiment. As shown, a vibration-absorbing sleeve 420 surrounds each cylindrical fastener 408 that passes through the reaction mass 406 and anchor block 412 (not shown in this view). The fasteners 408 also pass through vibration absorbing layer 410 and plate 422 beneath reaction mass 406 to couple the reaction mass to the centrifuge arm (not shown).

As shown more clearly in this view, vibration-absorbing layer 410 absorbs vibrations in the axial direction A exerted against reaction mass 406 as well as vibrations in the radial direction R exerted against fasteners 408.

Figure 6:
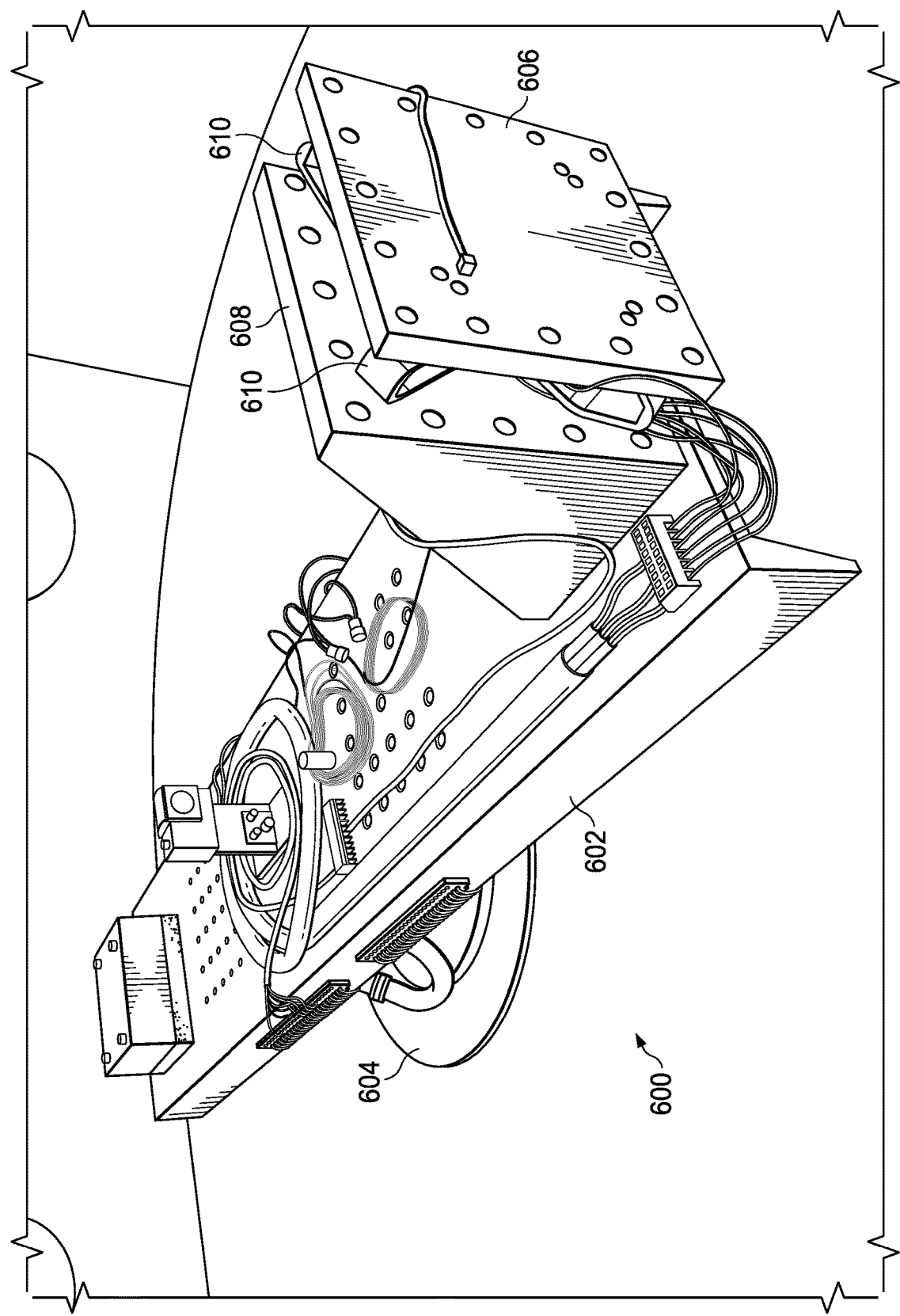
FIG. 6 depicts a perspective view of a vibrafuge system in accordance with an alternate embodiment.
Figure 7:
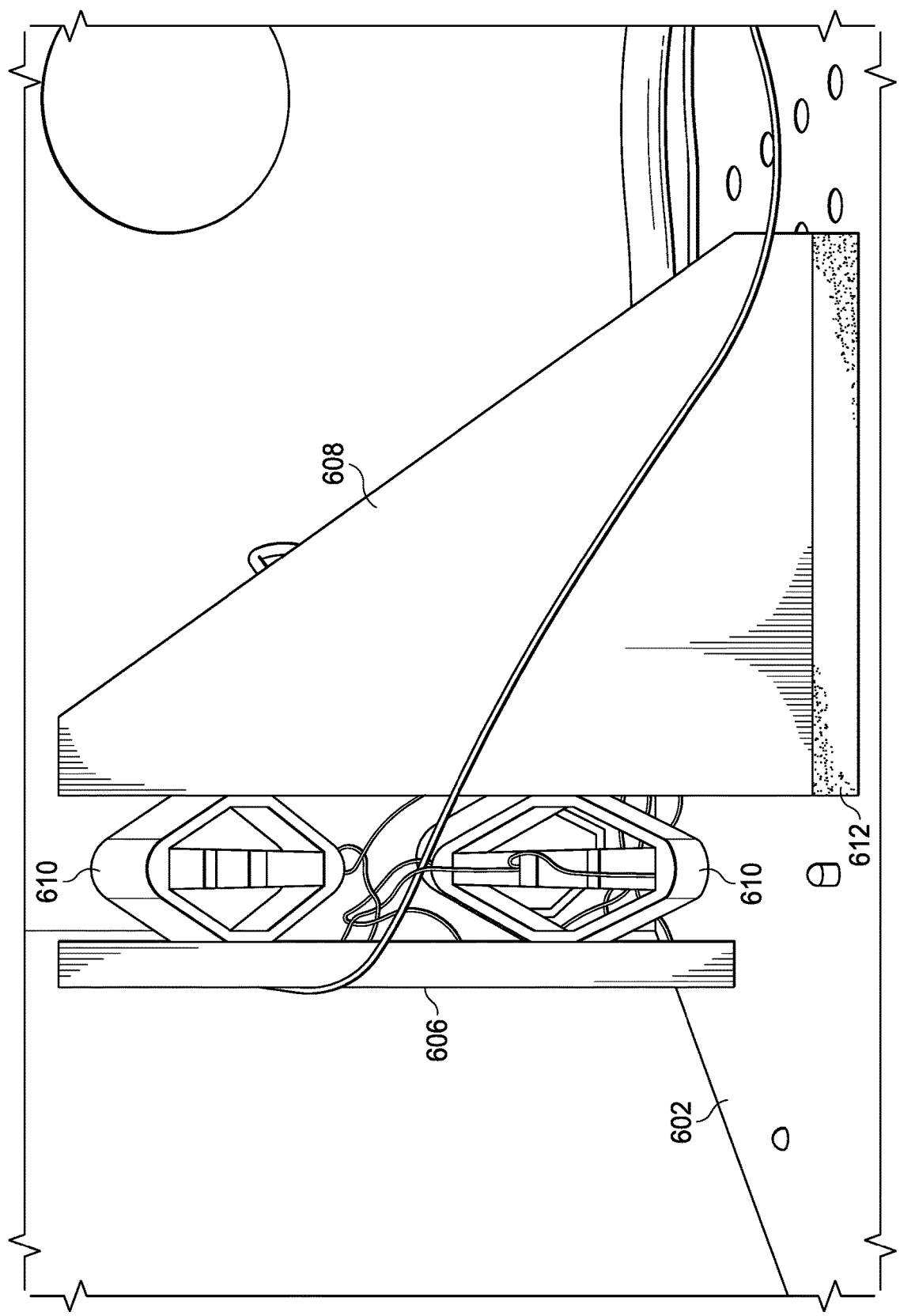
FIG. 7 illustrates a side view of the vibrafuge system in accordance with the alternate embodiment.

FIG. 6 depicts a perspective view of a vibrafuge system in accordance with an alternate embodiment. FIG. 7 illustrates a side view of the vibrafuge system in accordance with the alternate embodiment.

Virbrafuge system 600 is another example of vibrafuge system 100 shown in FIG. 1. Like vibrafuge system 200, vibrafuge system 600 comprises a centrifuge arm 602 that rotates around a rotational axis on bearings 604. However, in this embodiment, the test payload platform 606 extends off the distal end of the centrifuge arm 602 and is coupled to reaction mass 608 by four piezoelectric actuators 610 sandwiched between the payload platform 606 and reaction mass 608.

In this embodiment, there is no anchor block. Rather, the reaction mass 608, via the piezoelectric actuators 610, is the sole mechanical connection between the payload platform 606 and the centrifuge arm 602. As shown more clearly in FIG. 7, a layer of vibration absorbing material 612 is sandwiched between the reaction mass 608 and centrifuge arm 602.

In the example shown in FIG. 6, there is only one reaction mass, set of piezoelectric actuators, and payload shown mounted to the centrifuge arm. However, it should be understood that a second reaction mass can be coupled to the distal end of the centrifuge arm opposite from the first reaction mass, with a second set of piezoelectric actuators coupling a second test payload platform to the second reaction mass, and a second layer of vibration-absorbing material sandwiched between the second reaction mass and the centrifuge arm.

Figure 8:
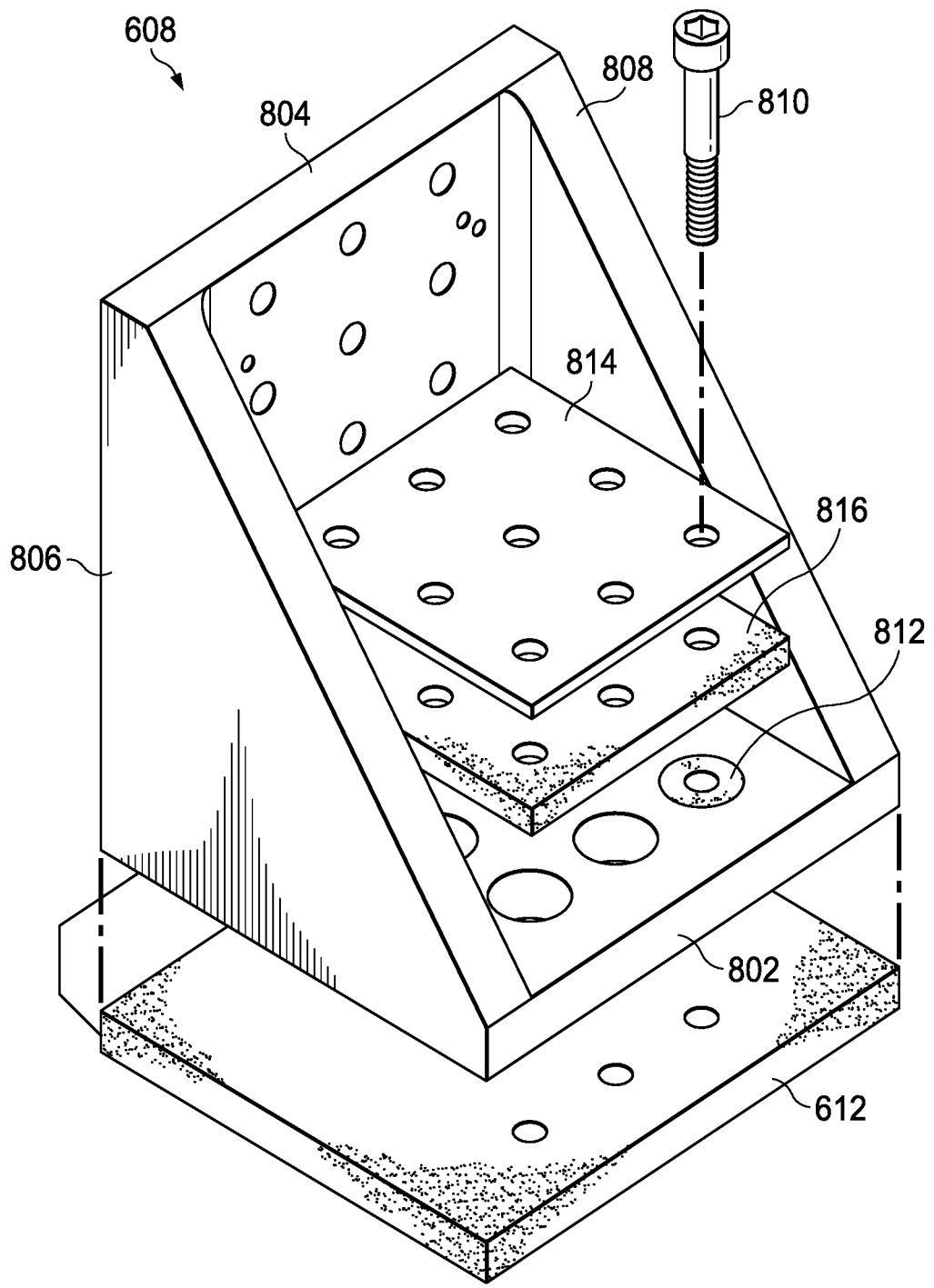
FIG. 8 illustrates an exploded perspective view of a vibrafuge reaction mass in accordance with the alternate embodiment.

FIG. 8 illustrates an exploded perspective view of a vibrafuge reaction mass in accordance with the alternate embodiment. As shown more clearly in this view, reaction mass 608 comprises a first plate 802 and second plate 804 approximately orthogonal to each other and reinforced by lateral gussets 806 and 808 on either side. The first plate 802 is connected to the centrifuge arm by cylindrical fasteners 810. The piezoelectric actuators 610 are coupled to the second plate 804.

As with the other embodiment, each cylindrical fastener 810 is surrounded by a sleeve of vibration absorbing material 812. The third plate 814 might also be coupled atop the first plate 802 of the reactive mass and a second layer of vibration-absorbing material 816 sandwiched between the third plate 814 and the first plate 802. Third plate 814 helps to distribute vertical load under the head of fastener 810 to the first plate 802 through the vibration-absorbing material 816. Essentially, third plate 814 functions similarly to a washer. Without the third plate 814, first plate 802 plate could push the vibration-absorbing material 816 upward through the head of fastener 810 as the assembly displaces vertically.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for isolating vibrations for centrifuge testing devices, the method comprising:
   coupling a test payload platform to a number of piezoelectric actuators;
   coupling the piezoelectric actuators to a reaction mass coupled to a centrifuge arm;
   sandwiching a layer of vibration-absorbing material between the reaction mass and the centrifuge arm;
   rotating the centrifuge arm around an axis; and
   vibrating the test payload platform with the piezoelectric actuators as the centrifuge rotates, wherein the layer of vibration-absorbing material prevents vibrations from traveling down the centrifuge arm.

2. The method of claim 1, wherein the reaction mass is coupled to the centrifuge arm by a number of cylindrical fasteners, and wherein each cylindrical fastener is surrounded by a sleeve of vibration-absorbing material.

3. The method of claim 1, further comprising coupling an anchor block to the centrifuge arm on a side of the test payload platform opposite the piezoelectric actuators and reaction mass, wherein test payload platform vibrates back and forth along linear slider rails between the reaction mass and anchor block.

4. The method of claim 3, further comprising sandwiching a layer of vibration-absorbing material between the anchor block and the centrifuge arm.

5. The method of claim 3, wherein the anchor block is coupled to the centrifuge arm by a number of cylindrical fasteners, and wherein each cylindrical fastener is surrounded by a sleeve of vibration-absorbing material.

6. The method of claim 1, wherein the vibration-absorbing material comprises rubber.

7. The method of claim 1, further comprising:
   coupling a second test payload platform to a second number of piezoelectric actuators;
   coupling the second piezoelectric actuators to a second reaction mass coupled to the centrifuge arm, wherein the second reaction mass is coupled to the centrifuge arm opposite the axis from the first reaction mass; and
   sandwiching a second layer of vibration-absorbing material between the second reaction mass and the centrifuge arm.

8. A centrifuge testing device, comprising:
   a centrifuge arm coupled to a rotational axis;
   a reaction mass coupled to the centrifuge arm;
   a layer of vibration-absorbing material sandwiched between the reaction mass and the centrifuge arm;
   a number of piezoelectric actuators coupled to the reaction mass; and
   a test payload platform coupled to the piezoelectric actuators, wherein the piezoelectric actuators are configured to apply vibrations to the test payload platform as the centrifuge arm rotates around the rotational axis, and wherein the layer of vibration-absorbing material prevents vibrations from traveling down the centrifuge arm.

9. The centrifuge device of claim 8, wherein the reaction mass is coupled to the centrifuge arm by a number of cylindrical fasteners, and wherein each cylindrical fastener is surrounded by a sleeve of vibration-absorbing material.

10. The centrifuge device of claim 8, further comprising an anchor block coupled to the centrifuge arm on a side of the test payload platform opposite the piezoelectric actuators and reaction mass, wherein test payload platform vibrates back and forth along linear slider rails between the reaction mass and anchor block.

11. The centrifuge device of claim 10, further comprising a layer of vibration-absorbing material sandwiched between the anchor block and the centrifuge arm.

12. The centrifuge device of claim 10, wherein the reaction mass is coupled to the centrifuge arm by a number of cylindrical fasteners, and wherein each cylindrical fastener is surrounded by a sleeve of vibration-absorbing material.

13. The centrifuge device of claim 8, wherein the vibration-absorbing material comprises rubber.

14. The centrifuge device of claim 8, further comprising:
   a second reaction mass coupled to the centrifuge arm opposite the rotational axis from the first reaction mass;

a second layer of vibration-absorbing material sandwiched between the second reaction mass and the centrifuge arm; and a second number of piezoelectric actuators coupled to the second reaction mass.

15. A centrifuge testing device, comprising:

a centrifuge arm coupled to a rotational axis;

a reaction mass coupled to a distal end of the centrifuge arm, wherein the reaction mass comprises a first plate and second plate orthogonal to each other and reinforced by lateral gussets, and wherein the first plate is connected to the centrifuge arm;

a layer of vibration-absorbing material sandwiched between the first plate of the reaction mass and the centrifuge arm;

a number of piezoelectric actuators coupled to the second plate of the reaction mass pointing distally from the rotational axis; and a test payload platform coupled to the piezoelectric actuators, wherein the piezoelectric actuators are configured to apply vibrations to the test payload platform as the centrifuge arm rotates around the rotational axis, and wherein the layer of vibration-absorbing material prevents vibrations from traveling down the centrifuge arm.

16. The centrifuge device of claim 15, wherein the first plate of the reaction mass is coupled to the centrifuge arm by a number of cylindrical fasteners, and wherein each cylindrical fastener is surrounded by a sleeve of vibration-absorbing material.

17. The centrifuge device of claim 15, further comprising:

a third plate coupled atop the first plate of the reactive mass; and a second layer of vibration-absorbing material sandwiched between the third plate and the first plate of the reaction mass.

18. The centrifuge device of claim 15, wherein the number of piezo electric actuators is four.

19. The centrifuge device of claim 15, wherein the vibration-absorbing material comprises rubber.

20. The centrifuge device of claim 15, further comprising:

a second reaction mass coupled to a distal end of the centrifuge arm opposite from the first reaction mass;

a second layer of vibration-absorbing material sandwiched between the second reaction mass and the centrifuge arm;

a second number of piezoelectric actuators coupled to the second reaction mass; and a second test payload platform coupled to the second piezoelectric actuators.

* * * * *